June 8, 1965 S. KALPAKCIOGLU 3,187,534
SPINNING MACHINE TOOL RING
Filed March 19, 1962
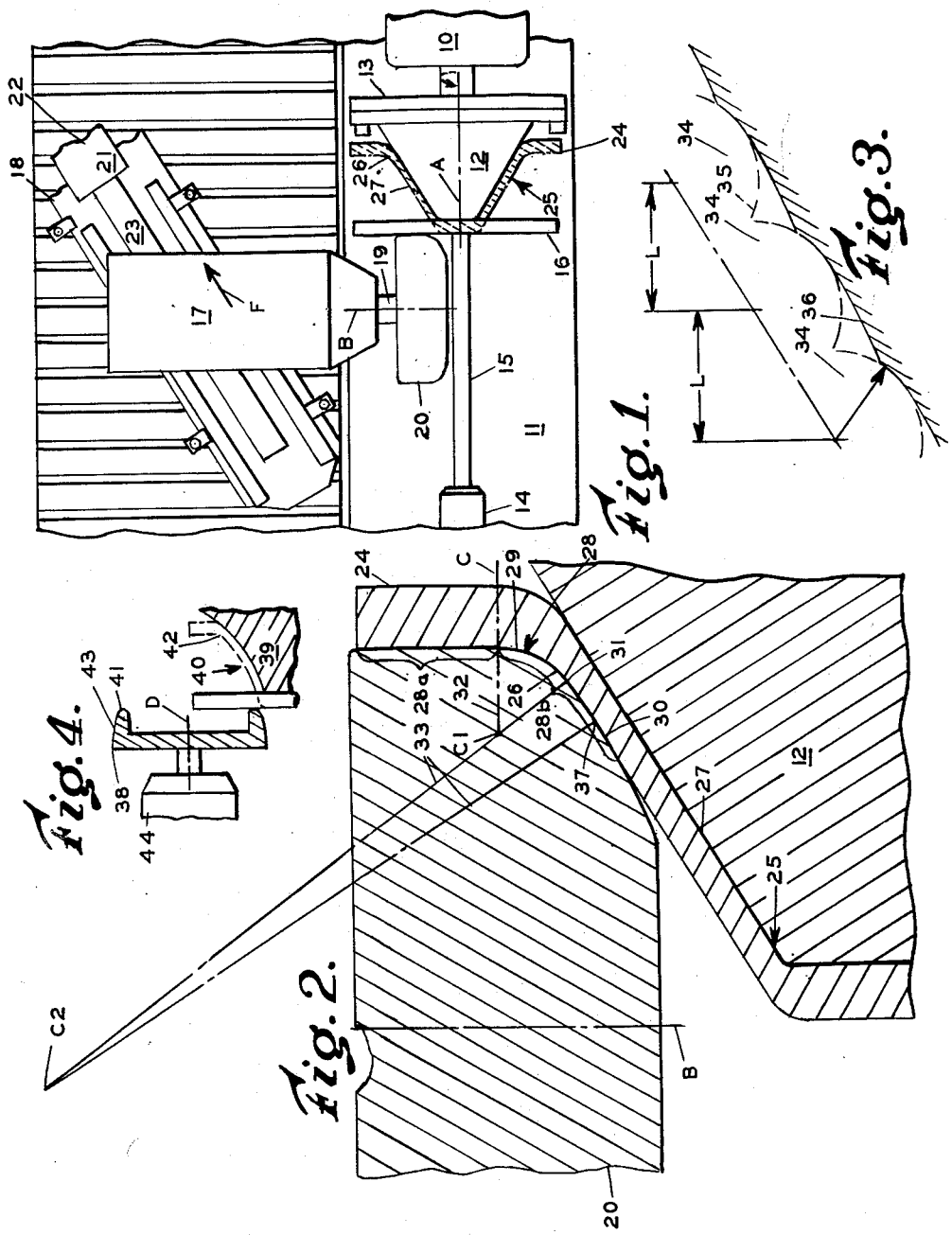
INVENTOR.
SEROPE KALPAKCIOGLU United States Patent Office 3,187,534
Patented June 8, 1965

3,187,534
SPINNING MACHINE TOOL RING
Serope Kalpakcioglu, Cincinnati, Ohio, assignor to The Cincinnati Milling Machine Co., Cincinnati, Ohio, a corporation of Ohio
Filed Mar. 19, 1962, Ser. No. 180,698
4 Claims. (Cl. 72—83)

The present invention relates to a shear spinning tool ring.

In shear spinning, a workpiece is formed on a rotating mandrel by a tool ring which is fed along the mandrel in engagement with the workpiece. Frequently, a radius on the tool ring determines a radius on the finished workpiece and, when this is so, that radius on the tool ring must be the same size as the radius desired on the finished workpiece.

When a tool ring presses against a workpiece on a rotating mandrel and is fed along the mandrel, the ring, which deforms the metal of the workpiece blank as it presses it against the mandrel, leaves a spiral trough in the workpiece, each turn in the trough axially spaced from the preceding turn a distance equal to the lead, that is, the axial feed travel per revolution of the mandrel. The depth of the trough depends on the lead and the tool ring radius in deforming contact with the workpiece: the smaller the lead and the larger the radius, the shallower the trough (and the smoother the finished surface of the workpiece). While the lead can be made as small as desired, the time expended in forming the workpiece increases inversely to the length of lead. The radius of the tool ring can be made quite large unless, as is often the case, a relatively small radius on the workpiece must be formed by the tool ring.

The tool ring of the present invention is capable of forming a relatively small radius on a workpiece and, at the same time, produces a finish on the workpiece equal in smoothness to that produced by a tool ring of relatively large radius. This is accomplished by providing two blending radii on the workpiece deforming portion of the tool ring, a small leading radius to form the desired radius on the workpiece and a large trailing radius which is effective to produce a smooth finish on the workpiece.

It is therefore one object of the present invention to provide an improved tool ring for a shear spinning machine. It is another object of the present invention to provide a tool ring capable of forming a small radius on the workpiece and producing a smooth finish on the workpiece. Other objects and advantages of the present invention should be readily apparent by reference to the following specification, considered in conjunction with the accompany drawings forming a part thereof, and it is to be understood that any modifications may be made in the exact structural details there shown and described, within the scope of the appended claims, without departing from or exceeding the spirit of the invention.

In the drawings:

FIG. 1 is a plan view of a shear spinning machine with a tool ring constructed in accordance with the present invention;

FIG. 2 is a greatly enlarged view of a cross-sectional plane containing the axis of rotation of the tool ring showing the tool ring engaged with a workpiece on the mandrel at the end of the feed movement of the tool ring;

FIG. 3 is a view showing, in dotted line, the outer surface of a workpiece if produced by a single radius tool ring with a lead L and showing, in solid line, the outer surface of a workpiece produced by the double radii tool ring of the present invention with the same lead, the lead distance shown being large for illustration purposes; and FIG. 4 is a fragmentary plan view of another spinning machine with a different tool ring which is also constructed in accordance with the present invention.

There is shown in FIG. 1 a power, or shear, spinning machine of the type described in U.S. Patent 2,960,951, issued November 22, 1960, to Charles Bierman, Jr. The machine has a headstock 10 mounted on bed 11 to drive a mandrel 12, connected to headstock face plate 13, for rotation on axis A. A tailstock 14, also mounted on bed 11, has a rotatable spindle 15 in axis A which is axially shiftable toward the mandrel to clamp a workpiece blank 16 against the end of the mandrel for rotation thereby. A tool carrier 17 is mounted on a base 18, which is secured to bed 11, and the tool carrier is slidable on the base 18 for guided movement parallel to the side of the mandrel 12. The tool carrier has a rotatable spindle 19 to which the tool ring 20 is secured for rotation about axis B. The mandrel shown for illustrative purposes in FIG. 1 is conical, being a truncated cone, and the tool carrier 17 is moved in translation along a straight path parallel to the side of the mandrel by a feed motor 21 comprising a piston slidably received in cylinder 22. Cylinder 22 is connected to base 18 and the piston therein has a piston rod 23 connected to the tool carrier 17.

In shear spinning, the workpiece is not only deflected onto the mandrel, but also undergoes internal deformation in a deformation zone since the spacing between the mandrel and tool ring is less than the original thickness of the workpiece blank. It is desirable that the portion of the surface of the tool which engages the workpiece in the deformation zone be arcuate in a plane containing the axis of rotation of the tool ring. If a surface which is straight in this plane is employed to deform the workpiece, the tool ring must be maintained in precise predetermined angular relationship to the side of the mandrel. Since, in shear spinning, the workpiece is drawn, and this drawing operation requires forces which set up stresses capable of causing deflection in the machine, a precise, constant alignment of the tool ring with the mandrel is difficult to maintain. Moreover, a tool ring with a straight workpiece engaging surface in the plane containing the axis of rotation of the tool ring is unsuitable for forming workpiece blanks on mandrels which have, for example, concave sides in cross-section. For these reasons, it is conventional to provide a tool ring with a conformation which is arcuate in a plane containing the axis of rotation of the tool ring to engage the workpiece in the deformation zone.

As the mandrel is rotated at a constant angular speed by the headstock, and the tool ring, which is rotated by engagement with the workpiece, is fed along the mandrel, parallel to the side of the mandrel, at a constant rate by the feed motor, the tool ring forms troughs on the workpiece as it presses the workpiece against the mandrel. The axial distance along the mandrel from a point in one trough to a corresponding point in the next trough equals the lead, that is, the axial distance along the mandrel traveled by the tool ring during one revolution of the mandrel. These troughs represent a roughness in the finish of the workpiece which depends on the relationship between the length of the lead and the radius of curvature of the portion of the surface of the tool ring pressing the workpiece into the mandrel. It has heretofore been recognized that either, or both, increasing the radius of curvature of the portion of the tool ring pressing the workpiece into the mandrel and/or decreasing the lead of the tool ring will produce a smoother finish on the surface of the formed workpiece. Conversely, it has been recognized that decreasing the radius of curvature of that portion of the tool ring and/or increasing the lead of the tool ring will produce a rougher finish on the workpiece. However, in many applications, there are compelling reasons for using a small radius of curvature on this portion of the tool ring and, since a reduction in the lead results in a corresponding increase in the time required to form the workpiece, it is undersirable to decrease the lead.

Many workpieces formed from the workpiece blank by the spinning operation have an unspun flange, such as the flange 24, on the finished workpiece (shown in phantom and cross-section at 25 in FIG. 1). The flange 24, which extends above the line C–C1 in FIG. 2, is not deformed during the operation and, consequently, is the same thickness as the original blank 16. Often a small radius, or radius of curvature, such as at 26, is required between the flange 24 and the body 27 of the workpiece. Since the small radius of curvature at 26 is formed by the tool ring at its extreme infeed position, the size of the radius of curvature on the tool ring forming this radius of curvature on the workpiece is dictated by the requirements of the workpiece.

In order to provide a small radius of curvature on the tool ring without deteriorating the finish produced, the tool ring of the present invention has two radii of curvature. There is shown in FIG. 2 the mandrel 12 in cross-section, a cross-section through the center of the tool ring 20 (in its final infeed position) to show a plane through the tool ring containing the axis of rotation B, and a finished workpiece 25 in cross-section. The tool ring, which is circular in a plane normal to the axis B, has a rim 28 constituting the portion of the tool ring engaging the workpiece 25 during forming. The rim 28 comprises a flange portion 28a, which merely engages the workpiece blank 16 without effecting deformation thereof, and a deformation portion 28b, which presses the workpiece blank into the mandrel and effects deformation of the workpiece. In any plane through the tool ring containing the axis of rotation of the tool ring, the deformation portion 28b of the rim has a leading edge and a trailing edge defined, respectively, by two arcs 29 and 30 blending together, that is, joining at a point 31 where the two radii of curvature 32 and 33, respectively, are coincident and are normal to a common tangent at point 31. The leading arc 29, that is, the arc in the direction of infeed movement indicated by arrow F in FIG. 1, forms the workpiece at 26 as the tool ring reaches its final infeed position. If the workpiece requires, for example, a circular arc of predetermined radius at this point, the arc 29 will be circular, with center C1 as shown, and will have the required radius, such as radius 32. If, however, the entire deformation portion of the rim 28 were of radius 32, and the lead were of length L as shown in FIG. 3, the troughs formed in the finished workpiece would be as indicated at 34 and the surface of the workpiece, indicated in dotted line at 35, would be rough. However, in the tool ring of the present invention, the trailing arc 30, which engages the workpiece after the leading arc, has a large radius of curvature. The arc 30, which can conveniently be of circular conformation with center C2 and radius 33 as shown, acts on the workpiece as a tool ring of large radius of curvature. With the same lead length L, the resulting troughs are shallow and the finished surface of the workpiece, indicated at 36 in FIG. 1, is considerably smoother than could be obtained from a single small radius tool ring.

In order to assure that the larger trailing arc plays a dominant part in determining the finish of the workpiece, the point 37, at which the tangent of the tool ring is parallel to the side of the mandrel, should be on the trailing arc 30. If the points 31 and 37 are spaced apart, as shown in FIG. 2, a very slight flare will be left on the body 27 of the finished workpiece, and, if a flare is not permissible, the point 37 must coincide with point 31. However, if a slight flare is permissible, it is preferable to have point 37 behind point 31 (relative to the direction of feed movement) so that, due to misalignment or deflection during forming, the tangent of the tool ring parallel to the side of the mandrel will not be at a point in arc 29 since this would diminish the extent of engagement of arc 30 with the surface of the workpiece and produce a rougher surface. As one example of a tool ring constructed in accordance with the present invention for operating with a lead of 0.030 inch, the radius 32 can be 0.10 inch the radius 33 can be 1.0 inch, and the distance between the points 31 and 37 can be the same as the lead, or .030 inch.

The tool ring 20 rotates about axis B which is oriented relative to the mandrel so that the outboard edge of the deformation portion of rim 28 constitutes the leading edge and has the leading arc 29 thereon, and the inboard edge of the deformation portion of the rim constitutes the trailing edge and has the trailing arc 30 thereon. As shown in FIG. 4, the tool ring 38 rotates about an axis D which is oriented relative to a mandrel 39 so that the inboard edge of the deformation portion of the tool ring rim initially contacts the workpiece 40 and constitutes the leading edge thereof, and the outboard edge of the deformation portion of the tool ring rim engages the workpiece after the inboard edge and constitutes the trailing edge of that rim portion. In this case, the inboard edge of the deformation rim portion has the relatively small leading arc 41 which forms the radius at 42 on the finished workpiece, and the outboard edge has the relatively large trailing arc 43 which leaves a relatively smooth finish on the workpiece. In the machine of FIG. 4, the mandrel 39, in cross-section, has concave sides and the tool carrier 44 is movable in translation along an arcuate path parallel to the side of the mandrel. It will be noted that any tool ring with a straight deformation surface (in a plane containing axis D), for pressing the workpiece into the mandrel 39 would not deform the entire body of the workpiece to the desired shape.

It should be noted that the axis of rotation of the tool ring can be oriented relative to the mandrel anywhere between the orientation shown in FIG. 1 and the orientation shown in FIG. 4. However, the two arcs on the deformation portion of the rim should bear the same relationship to the workpiece and mandrel as described in conjunction with FIG. 2.

I claim:

1. A tool ring for a shear spinning machine, the tool ring having a rim circular in a plane normal to the axis of rotation of the tool ring, said rim having a portion adapted to engage a workpiece blank for deformation thereof, said rim portion having two arcs in a plane containing the axis of rotation of the tool ring, said arcs blending together in said plane, one of said arcs engaging the workpiece blank after the other of said arcs and having a radius of curvature larger than the radius of curvature of the other of said arcs.

2. A tool ring for a shear spinning machine, the tool ring having a rim circular in a plane normal to the axis of rotation of the tool ring, said rim having a portion adapted to press a workpiece blank into the mandrel, said rim portion defining a leading circular arc and a trailing circular arc in a plane containing the axis of rotation of the tool ring, said circular arcs joining at a point having a tangent common to both circular arcs, the trailing arc having a radius substantially larger than the radius of the leading arc.

3. In a shear spinning machine having a rotatable tool ring and a mandrel about which a workpiece is formed, said machine having means to effect relative feeding movement between the tool ring and the mandrel, the tool ring having a rim circular in a plane normal to the axis of rotation of the tool ring, said rim having a portion pressing the workpiece into the mandrel as feeding movement between the tool ring and the mandrel is effected, said rim portion having a leading edge and a trailing edge, said leading and trailing edges arcuate in a plane containing the axis of rotation of the tool ring and blending together in said plane, the trailing edge having a radius of curvature larger than the radius of curvature of the leading edge.

4. In a shear spinning machine having a conical mandrel, a tool carrier, and means to effect a relative straight feeding movement parallel to the side of the mandrel between the mandrel and the tool carrier, the combination therewith of a tool ring mounted in the tool carrier for rotation about an axis, the tool ring having a rim circular in a plane normal to said axis of rotation, the rim having a portion pressing the workpiece into the mandrel as relative feeding movement is effected, said rim portion defining a leading circular arc and a trailing circular arc in a plane containing the axis of rotation of the tool ring, said circular arcs joining at a point having a tangent common to both circular arcs, the trailing arc having a tangent parallel to the side of the mandrel and the radius of said trailing arc substantially larger than the radius of the leading arc.

References Cited by the Examiner

UNITED STATES PATENTS 2,265,723  12/41  Dewey et al. ---------- 113—53
3,029,764  4/62   Sporck ---------------- 113—52

CHARLES W. LANHAM, *Primary Examiner.*

WILLIAM J. STEPHENSON, *Examiner.*